June 26, 1962 W. B. CAGLE ETAL 3,041,537

TRANSISTOR TEST SET

Filed Nov. 27, 1959 3 Sheets-Sheet 1

INVENTORS: W. B. CAGLE
W. G. MUROSKI

BY Kenneth B. Hamlin

ATTORNEY

June 26, 1962 W. B. CAGLE ET AL 3,041,537

TRANSISTOR TEST SET

Filed Nov. 27, 1959 3 Sheets-Sheet 2

INVENTORS: W. B. CAGLE
W. G. MUROSKI

BY Kenneth B. Hamlin

ATTORNEY

INVENTORS: W. B. CAGLE
W. G. MUROSKI
BY Kenneth B Hamlin
ATTORNEY 3,041,537
TRANSISTOR TEST SET

William B. Cagle, Madison, N.J., and Walter G. Muroski, Atlanta, Ga., assignors to Bell Telephone Laboratories, Incorporated, New York, N.Y., a corporation of New York Filed Nov. 27, 1959, Ser. No. 855,870
7 Claims. (Cl. 324—158)

Figure 1:
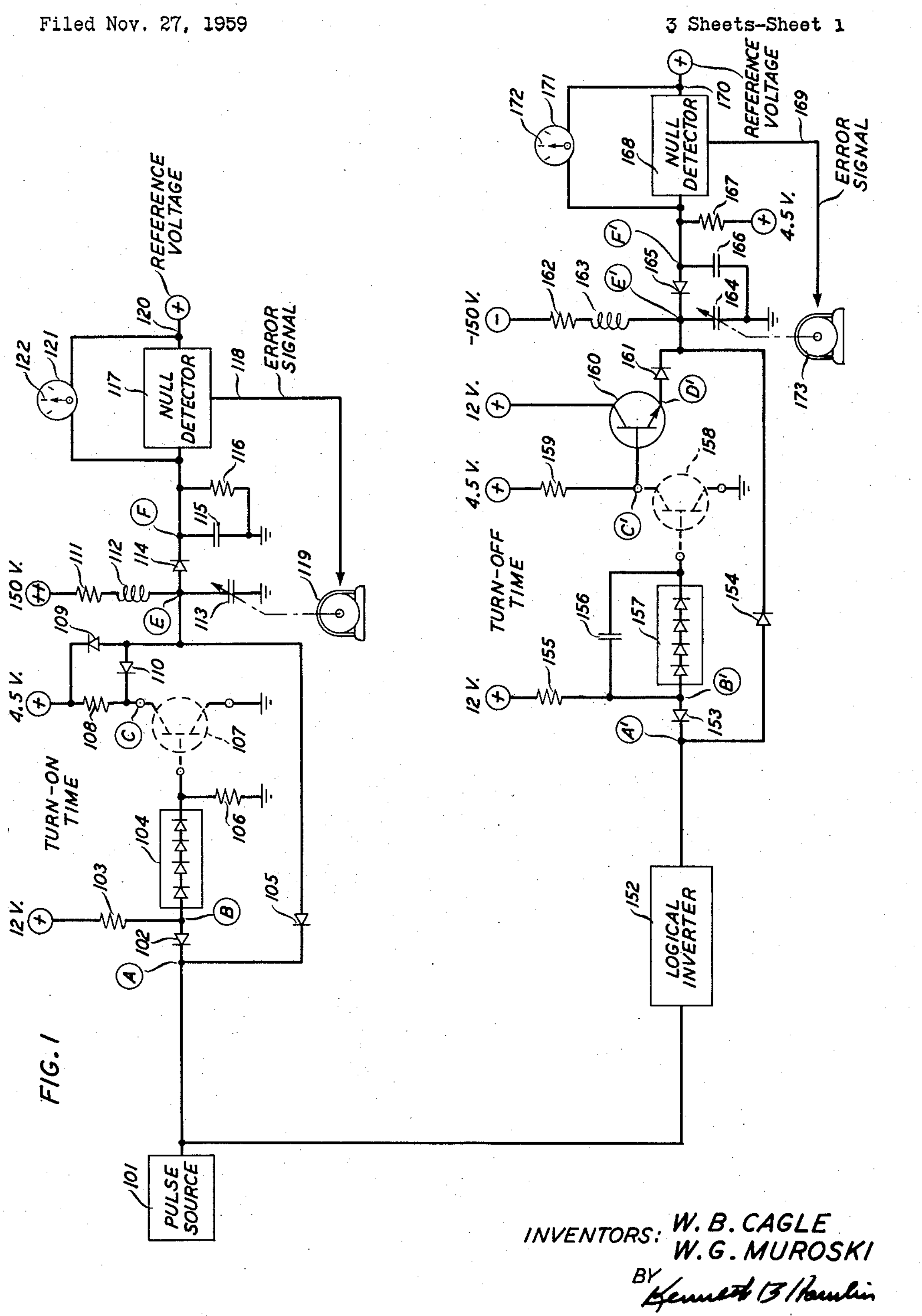

This invention relates in general to test circuits and more particularly to arrangements for determining the large signal switching characteristics of transistors.

Generally, transistors are characterized in terms of small signal transmission concepts wherein they are considered to be linear devices operating with small excursions about a fixed bias or operating point. In such situations the transient behavior of the transistor can be quite accurately predicted once an operating or bias point is chosen and the device parameters determined for that point. Unfortunately, however, when a transistor is used as a switch, as in logic and memory arrangements, its transient behavior is obscured by the nonlinearity resulting from the use of large input signals which drive a transistor through its entire operating range from cutoff to saturation.

In signal transmission systems, two circuit parameters are of extreme interest. Namely, these are gain, which overcomes the transmission losses encountered in traversing great distances, and bandwidth which determines the information carrying capacity of a system. Similarly, in switching and computing systems there are two important analogous circuit parameters, namely, gain and speed. In the latter systems the large transmission losses are absent, but there is the need to fan out and split signals to drive many circuit elements in parallel; therefore, there is the need for gain to overcome the dividing or splitting losses and to overcome the losses incurred in passive circuit elements. Furthermore, because many switching and computing work operations are cascaded, the delays in each operation must be minimized in the interest of efficient high speed operation. Consequently the speed of operation or response time of each circuit element, including transistors when employed as switches, is of extreme interest.

In switching and computing systems, both system gain and system response time are dependent upon the circuit parameters as well as upon the parameters of the transistors used therein. The term "switching time" as employed herein refers to the time required for the collector voltage of a transistor, when turned on, to fall to a specified level as well as the time required for the collector voltage of the transistor, when turned off, to rise to a specified level. The former time is called turn-on or rise time and the latter time turn-off time.

In the copending application No. 13,961 filed March 9, 1960, of M. L. Embree and L. J. Montone there is disclosed a circuit arrangement for measuring the turn-off time of transistors. Embree et al. apply an instruction pulse simultaneously to a transistor under test and to a time base ramp generator. The output waves of the transistor and the ramp generator have slopes of opposite polarities, and those waves are applied to opposite electrodes of a comparator diode. The diode is normally nonconducting until such time as the ramp voltage exceeds the transistor turn-off output voltage transient after partial switching by an amount corresponding to the diode forward turn-on bias. Conduction through the comparator diode and the transistor load resistor limits the ramp voltage excursion, and the ramp voltage is detected as an indication of the time required for the transistor to be partially switched.

It has been found, however, that when one test transistor is replaced by a different type of transistor with different characteristics, the load resistor must also be changed to accommodate the new characteristics. Consequently, the time base generator should also be changed in order to preserve the same limiting effect upon the ramp voltage when the comparator diode begins to conduct. As soon as the comparator diode begins to conduct current from the time base generator, the effective time constant is changed and the limiting effect is changed. In addition, it was found that with some combinations of transistor load resistance and time base generator circuitry the test transistor switching operation was affected by the added loading of the time base circuit.

It is, therefore, one object of the invention to improve circuits for measuring transistor switching times.

Another object is to simplify transistor switching time measuring circuits while at the same time improving the utility and reliability thereof.

In accordance with one aspect of this invention a direct reading switching time measuring set, of the type in which a switching circuit output voltage transient is compared with a ramp voltage of opposite slope, is provided with an auxiliary current source and with a switching stage responsive to output voltage changes of a switching circuit under test. Upon the attainment of a predetermined test circuit output voltage level the switching stage couples the current source to the time base generator for limiting the output voltage excursion thereof.

It is a feature of the invention that a relatively simple time base circuit may be employed to produce the desired ramp voltage wave for reliably and accurately measuring transistor turn-off times.

The invention and features thereof will be more fully and readily understood from the following detailed description with reference to the drawings in which:

FIG. 1 is a schematic diagram illustrative of one embodiment of this invention; and FIGS. 2, 3, 4, and 5 are time diagrams of the voltage waves at various points in the circuit as noted in the figures.

In FIG. 1 there is shown a pulse source 101, a turn-on time test circuit located in the upper portion of the figure and a turn-off time test circuit located in the lower portion of the figure. As shown in this illustrative example, the two circuits are operated independently. The theories of operation of the two test circuits are similar; however, because of the fewer circuit elements involved, the turn-on time test circuit is described first.

The following discussion can best be understood by referring to the time diagrams of FIGS. 2, 3, 4, and 5. These diagrams are discussed in detail following the descriptions of the operation of the turn-on time and turn-off time test circuits.

The pulse source 101 generates positive pulses which have a rise time of approximately 7 millimicroseconds, a repetition rate of approximately 100 kilocycles, a pulse width of about .5 microsecond, a base level of ground potential and a peak value of approximately +4.5 volts.

These pulses are employed as control signals in the transistor speed test. Although the characteristics of these pulses are not particularly critical, they must, however, meet certain requirements if high speed transistors having short rise and fall times, possibly as small as 16 millimicroseconds, are to be evaluated. For example, the rise time of the control pulse must be considerably shorter than the rise or fall time of the transistor under test and the off time between pulses must be sufficiently long to permit the transistor under test to return to its original state, either Off or On.

Under the influence of pulses from source 101, point A in the circuit of FIG. 1 varies in potential between ground and +4.5 volts. When point A is at ground potential, diodes 102 and 105 are both forward-biased and points B and E are above ground by an amount equal to the voltage drop in diodes 102 and 105, respectively. Diode 104 is a multiple junction diode which has a larger forward breakdown voltage than diode 102. Therefore, when point A is at ground potential and diode 102 is conducting, diode 104 will not conduct and transistor 107, the transistor under test, will be in the Off state. The voltage at point C, the collector of transistor 107, will then be at its source potential of +4.5 volts.

Similarly, with point E at substantially ground potential due to the clamping action of diode 105, the variable capacitor 113 will be substantially discharged.

Under the above-noted conditions, the gating diode 110 and the clipping diode 109 will both be back-biased. Clipping diode 109 serves merely to limit the voltage at point E whenever the transistor 107 is not in place.

Upon the occurrence of a pulse from source 101, point A will rise in potential until it reaches +4.5 volts and similarly the potential at point B will rise in a positive direction. As the voltage at point B increases, the multiple junction diode 104 will conduct, the base-to-emitter junction of transistor 107 will be forward-biased, and transistor 107 will start to conduct. As the collector current in transistor 107 increases, the voltage at point C will decrease until a value equal to the collector-emitter voltage drop of transistor 107 is reached.

Coincident with the drop in voltage at point C, the voltage at point E linearly increases. The charging path for capacitor 113 is from the +150 volt source through resistor 111 and inductor 112. Under these conditions, the diode 114 is forward-biased and capacitor 115 is charged to a voltage approximately equal to the voltage across capacitor 113, the difference in potential between capacitor 113 and capacitor 115 being the voltage drop across diode 114. As the voltage at point C falls, and the voltage at point E increases, there will be a point in time when these two voltages are equal. Immediately after this condition is reached, the voltage at point E will exceed that at point C, the diode 110 will be forward-biased and thereafter the charge on capacitor 113 will be dissipated through diode 110 and the transistor 107. Similarly, the charging current through resistor 111 and coil 112 is dissipated through diode 110 and transistor 107.

The diode 114, capacitor 115, and resistor 116 comprise a peak reading detector circuit. When the diode 110 becomes forward-biased and the voltage on capacitor 113 begins to fall, the diode 114 will become back-biased so that there is no rapid discharge path for the charge on capacitor 115. The charge on capacitor 115 therefore represents the peak voltage attained at point E. The value of this peak voltage is indicated by the voltmeter 121.

It should be noted at this point that the collector voltage, that is, the voltage at point C is initially 4.5 volts and falls to a point slightly above ground, possibly +.3 of a volt. The charging source for capacitor 113 is a 150 volt supply; therefore, diode 110 is placed in a conducting condition and the charging of capacitor 113 is halted long before the capacitor 113 reaches its maximum possible charge of 150 volts. This arrangement insures linear charging of the capacitor 113, that is, the voltage across capacitor 113 increases almost linearly with time. The charging of capacitor 115 terminates with the discharge of capacitor 113. The voltage at point F therefore represents the peak voltage which accrues at point E; however, the voltage at point E is slightly higher than that at point F due to the drop in diode 114.

The voltage developed across capacitor 115 is employed as one signal to the null detector 117.

As previously noted, turn-on time is defined as the period of time required for the collector voltage to fall to a specified level. In this one illustrative embodiment, the collector of transistor 107 is connected to a +4.5 volt source and transistor turn-on time is defined as the time required for the collector voltage to drop from +4.5 volts to 1.5 volts. The peak voltage to which capacitor 113 charges is slightly higher than the potential at point C when diode 110 becomes conducting and similarly is slightly higher than the peak charge on capacitor 115. The peak charge on capacitor 115 is not equal to the value of the potential at point C when the diode 110 becomes conducting; however, these two potentials are directly related. With this relationship in mind, a reference voltage, which is connected to the null detector 117 via conductor 120 is readily established. The null detector compares the voltages at point F with the reference voltage and develops an error signal on conductor 118. This error signal is employed in a manner well known in the art to control the reversible drive motor 119 which directly varies the capacitance of capacitor 113. A positive error signal causes the reversible motor to drive in one direction and a negative error signal causes the motor to drive in the opposite direction. In either instance, the error signal causes the capacitor 113 to be varied in a correcting direction so that the voltage at point F equals the reference voltage on conductor 120. Once a null condition has been established, the motor 119 will become de-energized.

In theory it is possible to assign various turn-on times to the mechanical settings of the capacitor 113 in accordance with calculations of the time constants of the integrating circuit. In practice, however, it is more desirable to first evaluate a number of transistors having widely spaced turn-on times by previously noted precision methods and then while evaluating the same transistor in the subject test circuit calibrate the mechanical setting of the capacitor in accordance with the data obtained by the noted precision methods.

The above discussion outlines the procedure for determining the period of time required to switch a transistor from the Off to the On state. Often, however, it is sufficient to know whether or not a transistor switches within a specified period of time. In this latter case, the capacitor 113 is set to the specified time, the reversible drive motor 119 is disabled and the reading of the voltmeter 121 is noted. The meter 121 is a sensitive zero center microammeter which is arranged to compare the voltage which is developed at point F with the reference voltage. If, when testing a transistor, the voltage at point F is less than the reference voltage as indicated by a reading on the meter 121 which lies to the left of the "0" center 122, the transistor 107 has switched within the specified period of time. However, if the voltage at point F rises above the reference voltage as indicated by the meter 121 being deflected to the right of the "0" center 122, the transistor under test is out of limits. The circuit of FIG. 1, therefore, may be employed as a go-no go device in which the test limits are established by the setting of the capacitor 113.

Figure 2:
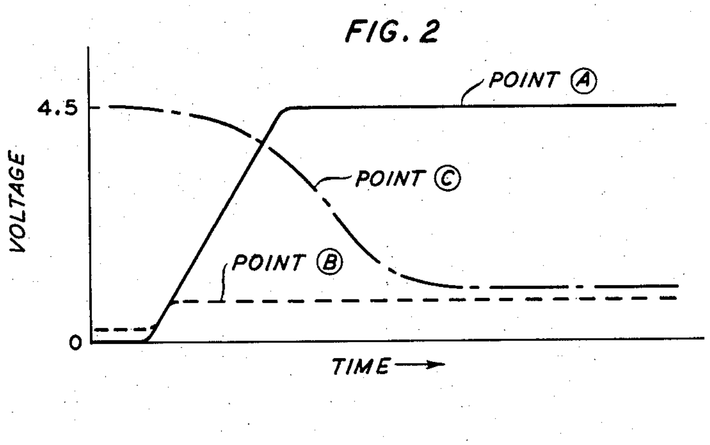

FIG. 2 is a time diagram of the voltages at points A, B, and C in the turn-on time tester of FIG. 1. As shown in FIG. 2, the voltage at point A varies from ground to +4.5 volts. This figure is not drawn to scale and is merely intended to illustrate the principles of the invention. Further, in FIG. 2, it is seen that point B which is the junction of the resistor 103 and the multiple junction diode 104 follows the voltage at point A; however, it is clearly seen that the potential at point B is much more limited than that at point A. Limiting occurs in this circuit when the multiple junction diode 104 and the base-to-emitter junction of transistor 107 becomes conductive. Also, as shown in FIG. 2, the collector voltage, that is, the voltage at point C in the turn-on time tester, is initially at 4.5 volts and falls until it reaches a plateau as indicated. The plateau voltage is equal to the collector-to-emitter drop of transistor 107 when it is in the fully On state.

Figure 3:
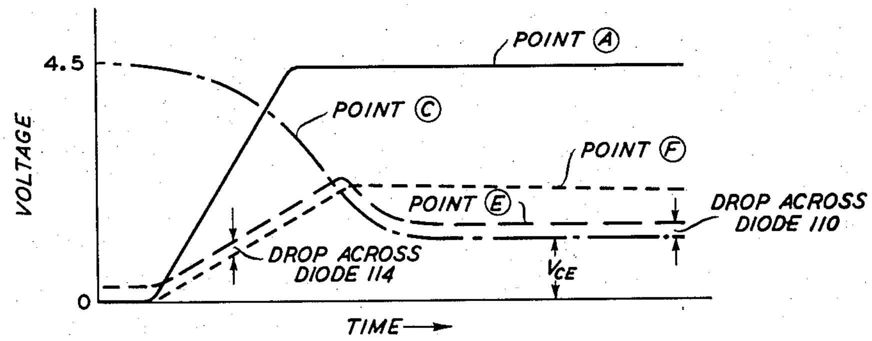
Figure 4:
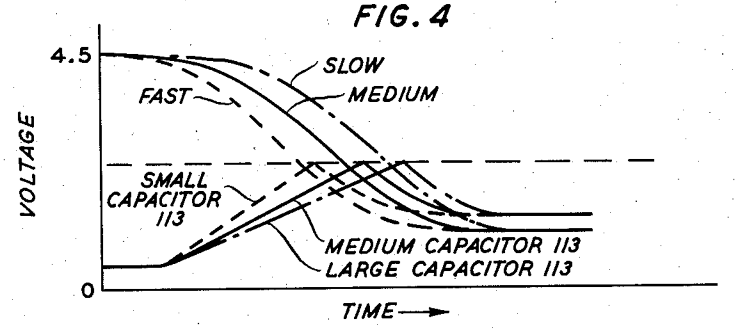

FIG. 3 also shows the voltage waves at points A and C in the turn-on time tester and in addition shows the voltage waves at points E and F. While point A is at ground potential, point F is similarly at ground potential and point E is above ground by an amount equal to the drop in diode 105. As point A leaves ground level, points E and F both linearly rise and the initial difference in potential between points E and F is maintained. Now, however, this difference in potential is due to the forward voltage drop in diode 114. Diodes 105 and 114 are of similar makeup; therefore, the two drops are approximately equal. When point E becomes more positive than point C, diode 110 begins to conduct and as shown in FIG. 3, the voltage at point E falls off and follows the curve at point C. The voltage at point E, however, always is slightly above the voltage at point C due to the forward drop in diode 110. Further, in FIG. 3, it is seen that the charging of the capacitor 115 and the attendant rise in voltage at point F terminates with the drop in potential at point E. It should be noted that point F does not rise as high as the peak attained at point E, and this difference in potential or difference in rise is due to the voltage drop in diode 114. After the potential at point E starts to fall, the diode 114 becomes back-biased and the potential at point F is substantially maintained. Any drop in potential at point F is due to the discharge of capacitor 115 through the resistor 116 and the input circuitry of the null detector 117. FIG. 3 shows the voltage waves at points E and F for one value capacitor 113. FIG. 4, however, shows the voltage waves at points C and E for various values of capacitor 113 and for transistors of various speeds.

In FIG. 4 there is shown a curve of the voltage at point C for a slow transistor and accompanying this curve, there is shown a complementary curve labeled large capacitor 113. Further, in FIG. 4, there is shown a curve of the voltage at point C for a fast transistor and accompanying curve of a voltage at point E which is labeled small capacitor 113, and between these two curves there lies a curve of the voltage at point C for a medium speed transistor and accompanying it is a curve of the voltage at point E for a medium value of capacitor 113.

The turn-off tester at the bottom of FIG. 1 is similar to the turn-on tester, however, there are certain differences in the input and output circuitry and these differences will be noted in detail in the following description. Obviously, in the case of the turn-off time tester, transistor 158, the transistor under test, must be initially in the On state.

The logical inverter 152 between the pulse source 101 and point A′ of the turn-off time tester is arranged to provide a logical inversion of the input signal from the pulse source 101. Accordingly, in the absence of a pulse from source 101, point A′ is held at +4.5 volts, and upon the occurrence of a pulse from source 101, point A′ falls to ground potential.

The circuitry to the right of point A′ in the turn-off time tester is similar to the circuitry to the right of point A in the turn-on time tester with the exception of polarities and the addition of the switching transistor 160 in the case of the turn-off time tester.

In the absence of an input pulse from the source 101, point A′ is at +4.5 volts and similarly point B′ is above ground and the multiple junction diode 157 is conducting. The base-to-emitter junction of transistor 158 is therefore forward-biased by a signal over a path which includes the +12 volt source, resistor 155, multiple junction diode 157, and the base-to-emitter junction of transistor 158 returned to ground. The transistor 158 is therefore fully saturated in the absence of a pulse from the source 101. Under these conditions, point C′ drops in potential to approximately 0.5 volt. The base-to-emitter junction of transistor 160 and the diode 161 are therefore both back-biased.

The control of the integrating circuit, which includes variable capacitor 164, will now be considered. As previously stated, in the absence of a positive pulse from source 101, point A′ will be held to approximately +4.5 volts and therefore point E′ will assume a similar voltage level due to diode 154 being forward-biased. The difference in potential between points A′ and E′ is equal to the forward voltage drop of diode 154.

With point C′ at +0.5 volt, and point E′ at +4.5 volts, the base-to-emitter junction of transistor 160 and diode 161 are both back-biased.

In the absence of a pulse from source 101, point E′ is held at approximately +4.5 volts by the diode 154 which carries the current from the −150 volt source through resistor 162 and coil 163. The voltages across capacitors 164 and 166 are therefore also at approximately +4.5 volts.

Upon the occurrence of a positive pulse from source 101, point A′ will drop to ground potential. The change in level at point A′ serves to turn off transistor 158 and simultaneously initiates the discharge of capacitor 164. This latter step might better be described as a charging of capacitor 164 in a negative direction as the change in voltage across capacitor 164 is a linear function of time.

When point A′ falls to ground potential, diode 153 fully conducts and the voltage at point B′ similarly falls to a point near ground potential. The forward-bias is therefore removed from multiple junction diode 157 and the base-to-emitter junction of transistor 158. Accordingly, transistor 158 is turned Off and the potential at point C′ tends to rise towards +4.5 volts.

While point C′ is becoming more positive, point E′ is becoming less positive. At a particular point in time, determined by the value of capacitor 164, point C′ will become more positive than point E′ and both diode 161 and the emitter-to-base junction of transistor 160 will become forward-biased. A substantial current is applied to capacitor 164 through the collector-emitter circuit of transistor 160 from the auxiliary 12-volt connection to the collector electrode of transistor 160. This current tends to restore positive charge on capacitor 164 and thereby places a strong back bias on diode 165. The charge at point F′ therefore represents the most negative excursion of point E′. The voltage at F′ is not fully equal to that reached at E′ because of the forward drop in diode 165. This maximum excursion of point F′ in a negative direction is employed as one input signal to the null detector 168. As a result of the action of switching transistor 160 and its auxiliary current supply connection, the direction of charge change on capacitor 164 is reversed without significantly affecting test transistor 158. This limiting action on the potential difference across capacitor 164 takes place sharply and with a known time relationship with respect to the occurrence of the desired switching condition of test transistor 158. Furthermore, operation of the integrating circuitry is now essentially independent of the magnitude of load resistor 159 in the test transistor circuit.

Turn-off time in this one illustrative embodiment is defined as the time required for the voltage at the collector of the transistor under test to rise to approximately 3 volts. The voltage at point C′ is higher than the voltage at point E′ by the base-to-emitter drop of transistor 160 and the forward drop of diode 161. The voltage at point F′ is similarly higher than the voltage at point E′; however, this difference in voltage is equal only to the voltage drop in diode 165. The peak voltage at point F′ is not equal to the voltage at point C′ when the transistor 160 and the diode 161 become conducting; however, these two voltages are directly related. With this relationship in mind, the value of the reference voltage on conductor 170 is readily determined. The potentiaal F′ is compared in the detector 168 with the reference voltage on conductor 170 and the null detector develops an error signal on conductor 169. The error signal is employed in a manner well known in the art to control the reversible drive motor 173 which directly varies the value of capacitor 164 in a direction to minimize the error signal on conductor 169. When a null condition has been established, motor 173 will be de-energized and the setting of capacitor 164 is noted.

As in the case of the turn-on time detector, the calibration of the mechanical setting of capacitor 164 can be calculated from the time constant of the integrating circuit; however, again it is more desirable to first evaluate a variety of transistors having widely spaced turn-off times and then while evaluating these same transistors by the subject test circuit, calibrate mechanical setting of the capacitor 164.

In the turn-on time tester, the voltage at the collector of the transistor 107 which is under test is matched against the voltage across the capacitor 113. In the turn-off time tester, however, the transistor 160 is placed between the collector of the transistor 158 which is under test and the high side of the capacitor 164. The voltage at the emitter of the transistor 160 varies inversely with the voltage at point C′ and changes in voltage at the emitter of transistor 160 follow changes in voltage at the collector of transistor 158 by a period of time equal to the response time of transistor 160. That is, when the transistor 158 is switched from its On to its Off state, the transistor 160 is switched from its Off to its On sate. The turn-on time of the transistor 160 is independent of the characteristics of the transistor 158; therefore, even though it is interposed between the point C′ and the point E′ it does not bring about any inconsistencies or inaccuracies in calibration.

As in the case of the turn-on time tester, the turn-off time tester may be operated as a go-no go device by mechanically setting the capacitor 164 to a specified time and disabling the reversible drive motor 173. As in the case of the turn-on time tester, voltmeter 171 is connected between point F′ and the reference voltage on conductor 170. If the voltage at point F′ does not drop below the reference voltage, the transistor under test has turned Off within the specified limits; and meter 171 will produce an indication on one side of its "0" center scale mark 172. However, if the voltage at point F′ falls below the reference voltage on conductor 170, the transistor 158 is outside of the prescribed limits; and meter 171 produces an indication on the other side of its "0" center scale mark 172.

Figure 5:
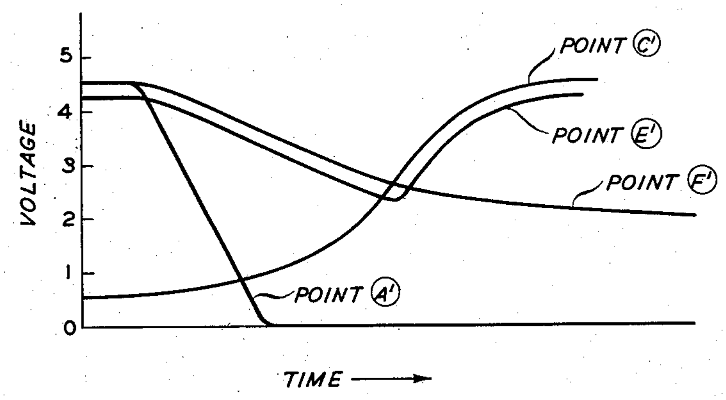

The voltages at the various points of interest in the turn-off time tester; namely, points A′, C′, E′, and F′ are shown as a function of time in FIG. 5. Point A′ is shown as initially being at +4.5 volts and falling to ground potential. Upon the occurrence of the change in voltage at point A′, the voltage at point C′ starts to rise and simultaneously the voltage at points E′ and F′ start to fall. The difference in potential between points E′ and F′ is equal to the forward voltage drop in diode 165. When the voltage at point C′ exceeds the voltage at point E′, transistor 160 and diode 161 will begin to conduct and the voltage at point E′, across capacitor 164, will tend to follow the voltage at point C′; however, the voltage at point E′ cannot rise to the voltage at point C′ because of the voltage drop in diode 161 and the voltage drop in the base-to-emitter junction of transistor 160.

The voltage across capacitor 166 of the peak reading detector follows the voltage at point E′ until such time as the diode 161 becomes conducting and the voltage on point E′ again starts to rise. As was the case in the turn-on time tester, the charge on capacitor 166 is representative of the maximum excursion of voltage on the integrating capacitor, and therefore, the voltage on the capacitor of the peak reading detector may be employed as one input to the null detector circuit.

It is to be understood that the above-described arrangements are illustrative of the application of the principles of the invention. Numerous other arrangements may be devised by those skilled in the art without departing from the spirit and scope of the invention.

What is claimed is:

1. A test circuit for determining the response time of a switching circuit producing an output voltage with a slope of a first polarity, said test circuit comprising timing means adapted to produce a ramp voltage output having a known slope of a second polarity, means applying pulses simultaneously to actuate said switching circuit and said timing means, a transistor having base, emitter, and collector electrodes, a source of potential, means connecting said source and the internal collector-emitter circuit of said transistor in series between the output terminals of said timing means, and means connecting said base electrode to the output terminal of said switching circuit for biasing said transistor On in response to a predetermined condition of said switching circuit output thereby limiting the maximum output potential of said timing means.

2. The test circuit in accordance with claim 1 in which said timing means comprises a second source of potential, a resistor, a coil, and a capacitor connected in series across the terminals of said second source, the terminal voltage of said second source having a sufficient magnitude to assure a substantially linear charge rate for said capacitor for time intervals in the range of anticipated times to be measured, and said capacitor being connected in shunt with respect to both the input and the output of said timing means.

3. The test circuit in accordance with claim 2 in which said means connecting the first-mentioned source and said transistor in a series circuit between the output terminals of said timing means comprises a diode connected in series therein and poled for forward conduction in the same direction as said emitter electrode.

4. The test circuit in accordance with claim 1 which comprises, in addition, means adjusting the slope of said ramp voltage, and control means connected to the output of said timing means and responsive to the peak magnitude of said ramp voltage for controlling said adjusting means.

5. In a circuit for measuring the response time of a test transistor having base, emitter, and collector electrodes, means connecting said transistor in a common emitter circuit configuration, timing means, circuit means applying pulses simultaneously to said transistor base electrode and to said timing means for initiating the operation of each of them, a switching transistor having a base-emitter circuit connected in series between the collector electrode of said test transistor and an output terminal of said timing means, and a current source connected to the collector-emitter circuit of said switch transistor for providing current to said timing means in response to the attainment of a predetermined output voltage at said test transistor collector electrode.

6. In a circuit for measuring the response time of a switching circuit to operate from a first to a second predetermined part of its output characteristic without significant loading, said switching circuit producing an output voltage having a slope of a first polarity when actuated between said predetermined parts of its output characteristic, said measuring circuit comprising timing means adapted to produce a ramp voltage output having a known slope of a second polarity, means applying pulses simultaneously to actuate said switch circuit and said timing means, a transistor having base, emitter, and collector electrodes, means connecting said base and emitter electrodes in series between output terminals of said switching circuit and said timing means, the base-emitter junction of said transistor being adapted to be forward biased in response to the attainment of said second predetermined part of the switch circuit output characteristic, and a current source connected to said collector electrode for supplying current to said timing means through the transistor collector-emitter path in response to actuation of said transistor.

7. The measuring circuit in accordance with claim 6 in which said switch circuit is a transistor connected in a common emitter circuit and of the same conductivity type as the first-mentioned transistor.

References Cited in the file of this patent

UNITED STATES PATENTS 2,931,980 Potter ---------- Apr. 5, 1960

2,932,792 Carroll et al. ---------- Apr. 12, 1960